United States Patent
Ferguson et al.

(10) Patent No.: US 10,160,677 B2
(45) Date of Patent: Dec. 25, 2018

(54) CHEMICAL FEEDER

(71) Applicant: Axiall Ohio Inc., Atlanta, GA (US)

(72) Inventors: Richard H. Ferguson, Cecil, PA (US); John Gary Miller, Waxhaw, NC (US)

(73) Assignee: EAGLE US 2 LLC, Houston, TX (US)

( * ) Notice: Subject to any disclaimer, the term of this patent is extended or adjusted under 35 U.S.C. 154(b) by 532 days.

(21) Appl. No.: 14/800,200

(22) Filed: Jul. 15, 2015

(65) Prior Publication Data
US 2016/0016832 A1  Jan. 21, 2016

Related U.S. Application Data

(60) Provisional application No. 62/024,655, filed on Jul. 15, 2014.

(51) Int. Cl.
*B01F 1/00* (2006.01)
*C02F 1/68* (2006.01)
*C02F 1/76* (2006.01)

(52) U.S. Cl.
CPC .............. *C02F 1/76* (2013.01); *B01F 1/0027* (2013.01); *B01F 1/0033* (2013.01); *C02F 1/688* (2013.01); *B01F 2001/0055* (2013.01); *B01F 2001/0061* (2013.01)

(58) Field of Classification Search
CPC .......... B01F 1/0027; B01F 1/0033; B01F 2001/0055; B01F 2001/0061; B01F 3/12; B01F 2003/125; C02F 1/68; C02F 1/687; C02F 1/688; C02F 1/76
See application file for complete search history.

(56) References Cited

U.S. PATENT DOCUMENTS

| | | | |
|---|---|---|---|
| 2,112,476 A * | 3/1938 | Riley | C02F 1/76 210/167.11 |
| 2,820,701 A | 1/1958 | Leslie | |
| 5,089,127 A | 2/1992 | Junker et al. | |
| 5,384,102 A | 1/1995 | Ferguson et al. | |
| 5,427,748 A | 6/1995 | Wiedrich et al. | |
| 5,441,073 A | 8/1995 | Hoadley | |
| 5,651,880 A * | 7/1997 | Johnson | B01F 1/0033 210/126 |
| 5,810,043 A | 9/1998 | Grenier | |
| 6,138,703 A | 10/2000 | Ferguson et al. | |
| 6,298,871 B1 | 10/2001 | Pickens et al. | |
| 6,444,174 B1 * | 9/2002 | Lascombes | B01F 1/0027 206/219 |

(Continued)

*Primary Examiner* — Lucas A Stelling
(74) *Attorney, Agent, or Firm* — The Webb Law Firm

(57) ABSTRACT

A chemical feeder includes a housing having a housing chamber, a sieve plate within the housing chamber, and a cartridge on an upper surface of the sieve plate. The cartridge includes a tubular member with a sidewall outer surface and a plurality of partitions extending from the sidewall outer surface to define a plurality of pockets, at least one of which contains a solid chemical material. The sieve plate includes a plurality of sieve plate inlet apertures, at least a portion of which are in fluid communication with at least one of the plurality of pockets. During operation, a feed liquid passes up through at least a portion of the sieve inlet plate apertures and into at least one pocket where it contacts a solid chemical material, so as to form a treated liquid that includes dissolved chemical material, at least a portion of which is removed through an outlet.

23 Claims, 8 Drawing Sheets

(56) References Cited

U.S. PATENT DOCUMENTS

| | | |
|---|---|---|
| 6,517,727 B2 | 2/2003 | Pickens et al. |
| 6,544,487 B1 | 4/2003 | Ferguson et al. |
| 6,610,199 B2 * | 8/2003 | Bittner ................... C02F 1/688 210/199 |
| 7,081,232 B1 | 7/2006 | Dooley, Jr. et al. |
| 7,604,018 B2 | 10/2009 | King et al. |
| 2002/0008067 A1 * | 1/2002 | Peddicord ................ B01J 49/75 210/670 |
| 2005/0150823 A1 | 7/2005 | Eserkaln et al. |
| 2009/0255879 A1 | 10/2009 | Payeur |
| 2010/0012560 A1 | 1/2010 | Sims et al. |
| 2012/0111962 A1 | 5/2012 | Hayas et al. |

* cited by examiner

CHEMICAL FEEDER

CROSS-REFERENCE TO RELATED APPLICATION

The present application claims priority to U.S. Provisional Application No. 62/024,655, filed on Jul. 15, 2014, the disclosure of which is incorporated herein by reference in its entirety.

BACKGROUND OF THE DISCLOSURE

Field of the Disclosure

The present disclosure relates to a chemical feeder that comprises a housing having a housing chamber, a sieve plate within the housing chamber that comprises a plurality of sieve plate apertures, and a cartridge that resides on an upper surface of the sieve plate, the cartridge having a tubular member and a plurality of partitions extending from an outer surface of the tubular member toward an inner wall of the housing to define a plurality of pockets which are configured to contain a solid chemical material that is exposed to a feed liquid that flows upwardly through at least some of the sieve plate apertures.

Description of the Related Art

Chemical feeders can be used to produce various mixtures, such as aqueous solutions of water treating agents, that can be used for the disinfection of effluent from sewage treatment plants, for the chlorination of water in swimming pools and hot tubs, and for the delivery of other water soluble chemicals to aqueous streams and water systems. In some instances, a solid treatment chemical is placed within the chemical feeder where it comes into contact with a liquid, such as water, to form a treated liquid composition, such as a treated aqueous composition.

It is desirable that the chemical feeder produce treated liquid compositions that contain a controllable and reproducible level of treatment chemical therein. Variability in the rate at which a solid treatment chemical dissolves in the liquid that is introduced into the chemical feeder can result in an undesirable variation in the concentration of treatment chemical in the treated liquid that is removed from the chemical feeder during operation thereof. In the case of sanitizing treatment chemicals, for example, such variability in the concentration of the sanitizing chemical(s) can result in reduced sanitizing properties, when the concentration drops below a minimum threshold, or the concentration can rise above a maximum desired threshold. In some situations, the solid treatment chemical charged to a chemical feeder is exposed to excess liquid, which results in the solid treatment chemical dissolving too quickly, and/or the formation of a treated liquid having an undesirably high level of the treatment chemical. The solid treatment chemical dissolving too quickly can result in the need to frequently recharge the chemical feeder with new or replacement solid treatment chemical.

It would be desirable to develop new chemical feeders that can be used to produce treated liquid compositions from solid treatment chemicals. It would be further desirable that such newly developed chemical feeders provide a desirable rate at which the solid treatment chemical dissolves, and a controllable, reliable, and reproducible level of treatment chemical in the treated liquid compositions that are removed from the chemical feeder.

SUMMARY OF THE DISCLOSURE

In accordance with some aspects of the present disclosure, there is provided a chemical feeder comprising a housing with a housing base and a housing sidewall that together define a housing chamber having an inner surface. The chemical feeder comprises a sieve plate having an upper surface, a lower surface, and at least one sieve plate inlet aperture extending from the lower surface to the upper surface of the sieve plate. The sieve plate is positioned within the housing chamber and above an inner surface of the housing base. At least one inlet is provided in the housing through which a feed liquid is introduced into the housing chamber. At least one outlet is provided in the housing through which a treated liquid comprising dissolved chemical material is removed from the housing chamber. The chemical feeder comprises a cartridge positioned within the housing chamber and above the upper surface of the sieve plate. The cartridge includes a tubular member having a bottom end, a top end, and a sidewall extending between the bottom end and the top end to define a sidewall outer surface. The cartridge includes a plurality of partitions extending outward from the sidewall outer surface of the tubular member to define a plurality of pockets. Each of the plurality of pockets is defined between and by adjacent partitions and the sidewall outer surface of the tubular member. At least one of the plurality of pockets is adapted to receive a solid chemical material therein. During operation, at least some of the feed liquid introduced into the housing chamber through the inlet passes through the at least one sieve plate inlet aperture into at least one of the plurality of pockets where the feed liquid contacts the solid chemical material residing within at least one of the plurality of pockets so as to form a treated liquid. At least a portion of the treated liquid is removed from the housing through the outlet.

In accordance with some aspects of the present disclosure, the bottom end of the tubular member can be offset from the upper surface of the sieve plate to define a fluid path between the at least one sieve plate inlet aperture and at least one of the plurality of pockets. At least a portion of the plurality of partitions has support legs positioned on the upper surface of the sieve plate to offset the bottom end of the tubular member from the upper surface of the sieve plate. Each of the plurality of pockets can be defined by the sidewall outer surface of the tubular member and the inner surface of the housing chamber. A first portion of the plurality of partitions can be defined by a first plate, wherein a second portion of the plurality of partitions is defined by a second plate. The first plate and the second plate can be interlocked with each other, and the first plate and the second plate can each have a slot configured to receive at least a portion of the sidewall of the tubular member.

In accordance with some aspects, the sieve plate further comprises at least one sieve plate outlet aperture extending from the lower surface to the upper surface of the sieve plate. The at least one sieve plate outlet aperture can be in fluid communication with the outlet and positioned under at least one of the plurality of pockets. The at least one sieve plate outlet aperture can be offset radially outward relative to the at least one sieve plate inlet aperture. The at least one sieve plate outlet aperture can be a plurality of sieve plate outlet apertures positioned under the plurality of pockets. The sieve plate can include a plurality of sieve plate support legs, each sieve plate support leg extending from an inner surface of the housing base to the lower surface of the sieve plate. The housing sidewall can include a support surface adapted for supporting the sieve plate on the support surface.

In some aspects, the chemical feeder comprises an inner sidewall residing within the housing chamber. The inner sidewall can extend from an inner surface of the housing base to the lower surface of the sieve plate and support the sieve plate and define an inner chamber residing below the sieve plate. The inlet can be in fluid communication with the inner chamber, and the inner chamber can be in fluid communication with the at least one sieve plate inlet aperture. The chemical feeder can include a cover adapted to enclose the top end of the tubular member. The cover can include at least one cover aperture extending through the cover and configured for facilitating removal of the cartridge from the housing chamber. A lid can be reversibly attached to an upper end of the housing sidewall.

In some aspects, a sleeve is provided between the tubular member and the housing sidewall. A bottom portion of the sleeve can be positioned on the upper surface of the sieve plate. The sleeve can include at least one sleeve aperture configured for facilitating removal of the sleeve from the housing. Each of the plurality of pockets can be further defined by the sidewall outer surface of the tubular member and an inner surface of the sleeve.

In accordance with some aspects, a cartridge for a chemical feeder includes a tubular member having a bottom end, a top end, and a sidewall extending between the bottom end and the top end to define a sidewall outer surface. The cartridge can further include a plurality of partitions extending radially outward from the sidewall outer surface to define a plurality of pockets. Each of the plurality of pockets can be defined between adjacent partitions and the sidewall outer surface of the tubular member. At least one of the plurality of pockets can be adapted to receive a solid chemical material.

In some aspects, a method of treating a body of liquid is provided and includes (a) providing the chemical feeder as described herein; (b) drawing the feed liquid from the body of liquid; (c) introducing the feed liquid into the inlet; (d) removing the treated liquid from the outlet; and (e) introducing at least a portion of the treated liquid into the body of liquid.

BRIEF DESCRIPTION OF THE DRAWINGS

The foregoing summary, as well as the following detailed description, will be better understood when read in conjunction with the appended drawings. In the drawings:

In FIGS. 1-8 like characters refer to the same components and/or streams, such as liquid streams, as the case may be, unless otherwise stated.

DETAILED DESCRIPTION

Figure 1:
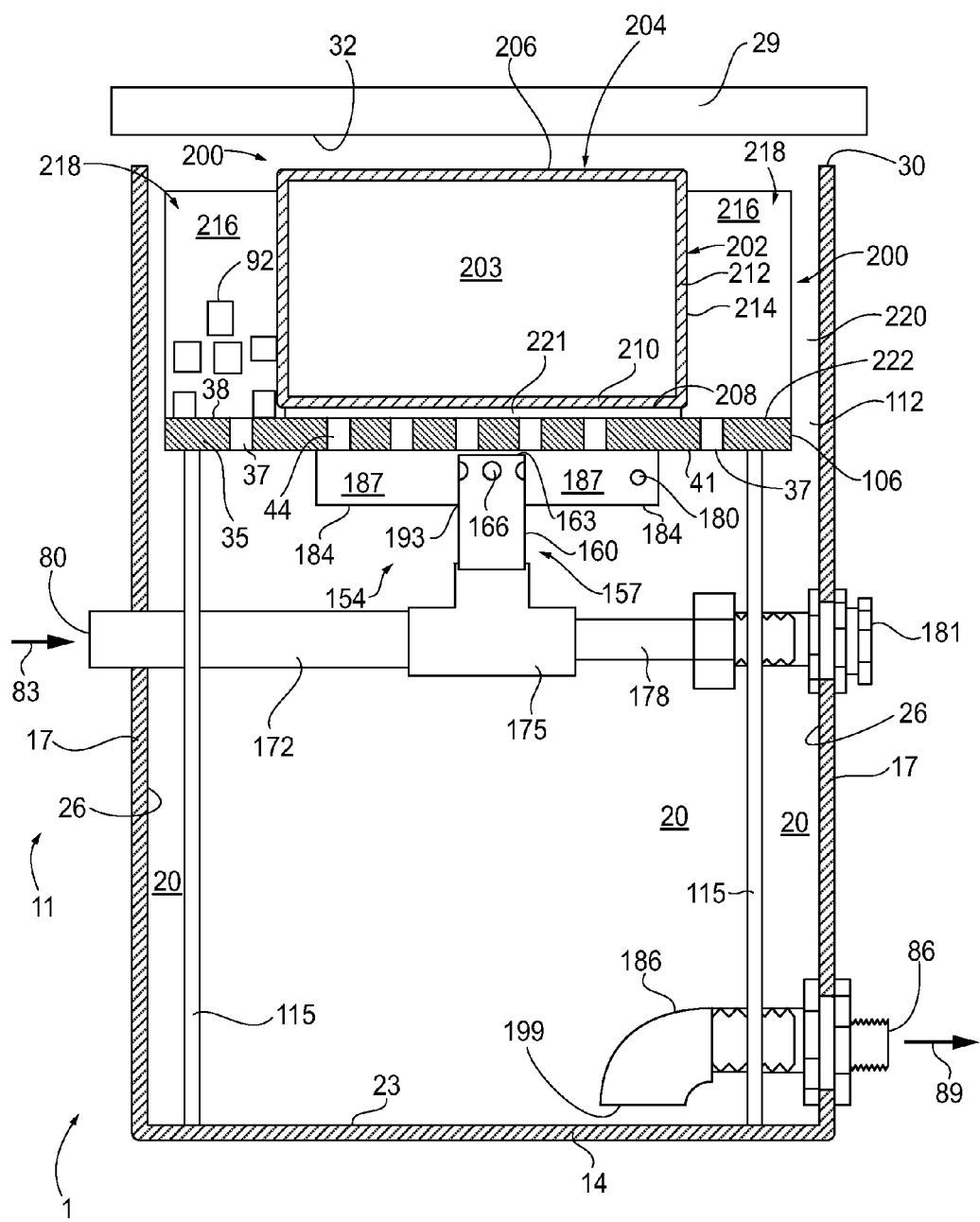
FIG. 1 is a representative, partially exploded, side, elevational, partial sectional view of a chemical feeder in accordance with some aspects of the present disclosure, which includes a plurality of sieve plate support legs.

The illustrations generally show non-limiting aspects of the systems and methods of the present disclosure. While the descriptions present various aspects of the devices, it should not be interpreted in any way as limiting the disclosure. Furthermore, modifications, concepts, and applications of the disclosure's aspects are to be interpreted by those skilled in the art as being encompassed, but not limited to, the illustrations and descriptions herein. Various modifications, equivalents, variations, and alternatives, however, will remain readily apparent to those skilled in the art. Any and all such modifications, variations, equivalents, and alternatives are intended to fall within the spirit and scope of the present disclosure.

As used herein, the singular articles "a," "an," and "the" include plural referents unless otherwise expressly and unequivocally limited to one referent. Further, for purposes of the description herein, the terms "end", "upper", "lower", "right", "left", "vertical", "horizontal", "top", "bottom", "lateral", "longitudinal" and derivatives thereof shall relate to the disclosure as it is oriented in the drawing figures. The term "proximal" refers to a direction toward the center or a central region of a device. The term "distal" refers to a outward direction extending away from a central region of a device. However, it is to be understood that the disclosure may assume various alternative variations and step sequences, except where expressly specified to the contrary. It is also to be understood that the specific devices and processes illustrated in the attached drawings, and described in the following specification, are non-limiting representations of various aspects of the disclosure. Hence, specific dimensions and other physical characteristics related to the aspects disclosed herein are not intended to be and should not be considered as limiting.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10. Unless otherwise indicated, all numbers expressing dimensions, quantities of ingredients, flow rates, pressures, and so forth used in the specification and claims are to be understood as modified in all instances by the term "about."

All documents, such as but not limited to issued patents and patent applications, referred to herein, and unless otherwise indicated, are to be considered to be "incorporated by reference" in their entirety.

With reference to FIG. 1 of the drawings, there is depicted a chemical feeder 1 according to some aspects of the present disclosure. The chemical feeder 1 comprises a housing 11 that includes a housing base 14 and a housing sidewall 17 that extends upward from the housing base 14. The housing base 14 and housing sidewall 17 together define a housing chamber 20 that resides within the housing 11. More particularly, the housing base 14 has an interior surface 23 that defines a bottom portion of the housing 11, and the sidewall 17 has an interior surface 26 that defines a side portion of the housing 11. The interior surface 23 of the housing base 14 and the interior surface 26 of the sidewall 17 together define the housing chamber 20, in some aspects.

With continuing reference to FIG. 1, the housing 11 of the chemical feeder 1 comprises at least one sidewall, such as a housing sidewall 17. As used herein, the term "a housing sidewall" means "at least one housing sidewall" that, with some aspects, defines a housing sidewall structure, and correspondingly includes singular and plural referents thereof. In some aspects, the housing sidewall 17 is a unitary sidewall (or unitary sidewall structure). In some further aspects, the housing sidewall comprises two or more housing sidewalls (not depicted in the drawings).

The housing 11, in some aspects, is a substantially cylindrical housing. The housing 11 can, in some aspects, have other shapes including, but not limited to, spherical and multi-sided shapes, such as square-tubular, recta-tubular, hexa-tubular and octa-tubular. In some aspects, the shape of the housing chamber 20 defined by the interior surfaces 23 and 26 can be different than the external shape of the housing sidewall 17 and housing base 14. For purposes of non-limiting illustration, the exterior shape of the housing sidewall 17 can be square, and the housing base 14 can be square or circular, while the interior surfaces 23 and 26 define a substantially cylindrical housing chamber 20.

With continuing reference to FIG. 1, the housing base 14 is affixed to the bottom of the housing sidewall 17. In some aspects, the housing base 14 is attached to the bottom of the housing sidewall 17 by art-recognized reversibly closeable systems, such as matching threaded sections and/or fasteners (not shown). In some aspects, the housing base 14 is attached to the housing sidewall 17 by a substantially permanent system, such as by adhesives and/or welds. In some aspects, the housing base 14 and housing sidewall 17 together form (or are) a unitary housing base-housing sidewall structure formed, for example, by molding.

The housing 11, in some aspects, has a closed top. In some aspects, the top of the housing 11 is closed with a lid, which can be reversibly closeable. As shown in a partially exploded, side elevational view of FIG. 1, the chemical feeder 1 can have a lid 29 that is attached to a top or upper end 30 of the housing sidewall 17. The lid 29 engages sealingly with the top/upper end 30 of the housing sidewall 17, in some aspects. The lid 29 can be attached to the top of the housing sidewall 17 by art-recognized systems, which include, for example, bolts, clamps, and/or matching threaded sections (not shown). One or more gaskets (not shown) can be sealingly interposed between an interior surface 32 of the lid 29 and the top end 30 of the housing sidewall 17, in some aspects. The interior surface 32 of the lid 29 together with the interior surfaces 26 and 23 of the housing sidewall 17 and housing base 14, also serve to define the housing chamber 20, with some aspects.

With further reference to FIG. 1, the chemical feeder 1 comprises a sieve plate 35, which has an upper surface 38, a lower surface 41, and a plurality of sieve plate inlet apertures 44 that extend from the lower surface 41 to the upper surface 38 of the sieve plate 35. The sieve plate 35 comprises a plurality of sieve plate outlet apertures 37 that extend from the lower surface 41 to the upper surface 38 of the sieve plate 35. The sieve plate outlet apertures 37 are spaced radially outward relative to the sieve plate inlet apertures 44. The sieve plate 35 is positioned within the housing chamber 20 and above the interior surface 23 of the housing base 14.

The sieve plate 35 can be supported within the housing chamber 20 and above the interior surface 23 of the housing base 14 by systems including, but not limited to, a plurality of sieve plate support legs and/or an inner sidewall, each of which are described in further detail herein.

The chemical feeder 1, in some aspects, comprises at least one inlet 80 in the housing 11 through which a feed liquid (as depicted by an arrow 83) is introduced into the housing 11, such as into the housing chamber 20. In some further aspects, the inlet 80 is positioned below the sieve plate 35. Each inlet 80 can be independently positioned in (or through) any appropriate portion or portions of the housing 11, such as, but not limited to, in the housing sidewall 17 and/or housing base 14. In some aspects, and as depicted in the drawings, the inlet 80 is in (or extends through) the housing sidewall 17.

Figure 4:
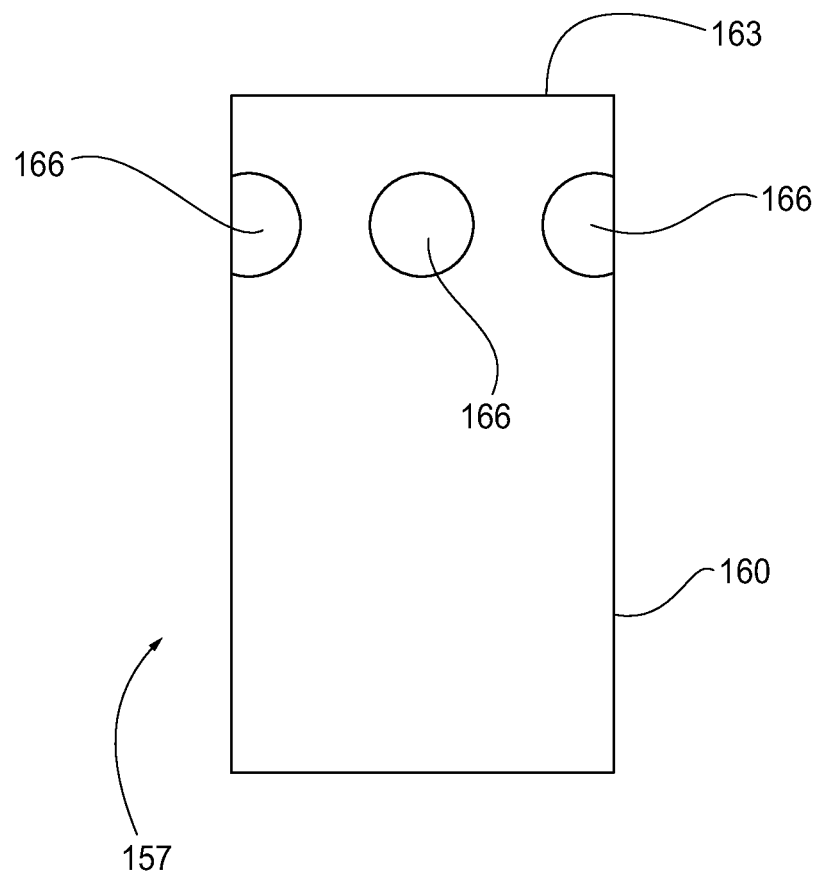
FIG. 4 is a representative side elevational view of a distributor head of a nozzle of a chemical feeder in accordance with some aspects of the present disclosure.
Figure 5:
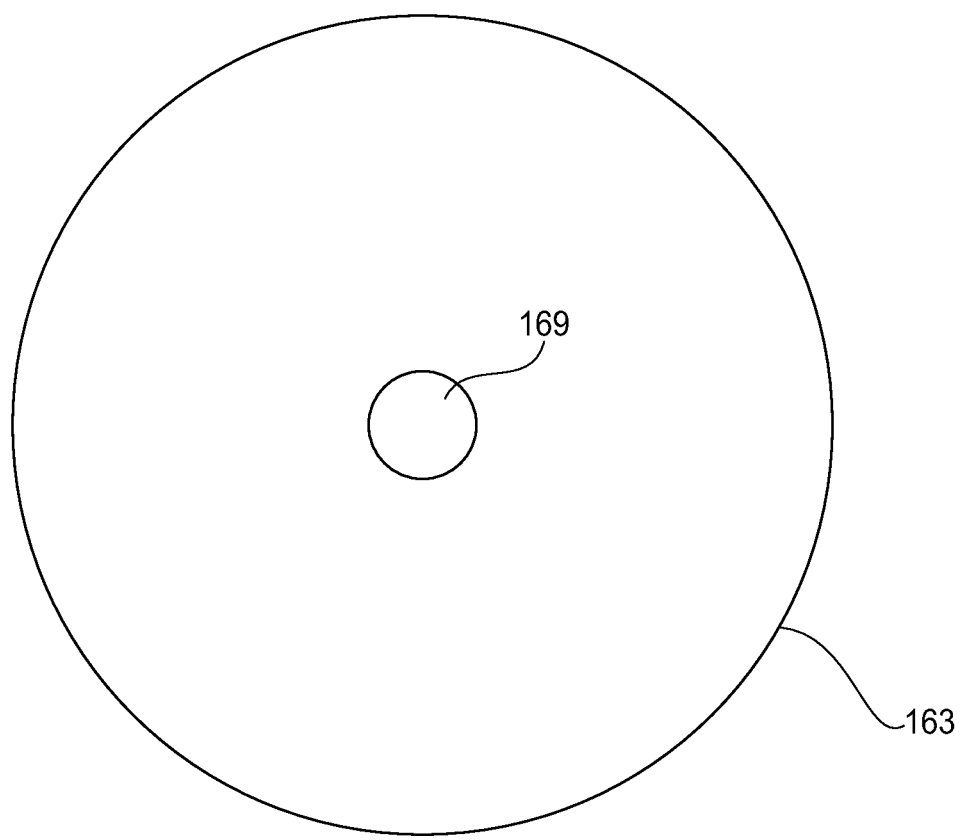
FIG. 5 is a representative top plan view of the dome of a distributor head, in accordance with some aspects, which includes a dome hole.

For purposes of non-limiting illustration, and with reference to FIGS. 1, 4, and 5, the chemical feeder 1 comprises a nozzle 154 that is in fluid communication with the inlet 80 of the housing 11. The nozzle 154 includes a distributor head 157. The distributor head 157 comprises at least one a distributor head sidewall 160 and a dome 163. With the distributor head 157: (i) the distributor head sidewall 160 includes at least one distributor head aperture 166; and/or (ii) the dome 163 includes at least one dome hole 169 (shown in FIG. 5). In other aspects, the distributor head sidewall 160 includes at least one distributor head aperture 166, while the dome 163 is closed. The nozzle 154, in some aspects, extends upwardly towards the lower surface 41 of the sieve plate 35, and the feed liquid introduced through the inlet 80 of the housing 11 passes through the nozzle 154, through and out of the distributor head 157 (via the distributor head aperture(s) 166 and/or dome hole(s) 169), and up through at least some of the sieve plate inlet apertures 44.

As used herein the term "a distributor head sidewall" means "at least one distributor head sidewall" that, with some aspects, defines a distributor head sidewall structure, and correspondingly includes singular and plural referents thereof. In some aspects, the distributor head sidewall is a unitary distributor head sidewall (or a unitary distributor head sidewall structure). In some further aspects, the distributor head sidewall comprises two or more distributor head sidewalls (not depicted in the drawings).

With further reference to FIG. 1, in some aspects, the inlet 80 of the housing 11 is in fluid communication with an inlet pipe 172, which is in fluid communication with a T-fitting 175. The T-fitting 175 is in fluid communication with the nozzle 154. The T-fitting 175 is also connected to an extension 178 that extends through the housing sidewall 17. The extension 178 includes, with some aspects, an extension plug 181, which prevents liquid from exiting the housing 11 through the extension 178. In some aspects, the extension 178 serves to support and stabilize the nozzle 154 beneath the sieve plate 35.

The distributor head 157 (or a portion of the distributor head), with some aspects, resides sealingly within a collection casing chamber 187. With further reference to FIG. 1, the portion (such as the upper portion) of the distributor head 157, which includes (i) distributor head aperture(s) 166 and/or (ii) dome hole(s) 169, resides sealingly within the collection casing chamber 187. The distributor head 157, in some aspects, extends sealingly into the collection casing chamber 187 through a collection casing hole 193. A gasket (not shown) can, in some aspects, be positioned sealingly between the collection casing hole 193 and the distributor head sidewall 160.

With further reference to FIG. 1, for purposes of non-limiting illustration and in some aspects, feed liquid (as indicated by the arrow 83) is introduced into the housing 11 through the inlet 80. The feed liquid passes through the inlet pipe 172, through the T-fitting 175, up through the nozzle 154, and into the distributor head 157. The feed liquid exits the distributor head 157 through: (i) the distributor head aperture(s) 166; and/or (ii) the dome hole 169, if so equipped.

With continuing reference to FIG. 1, the chemical feeder 1 comprises, in some aspects, a collection casing 184, which is attached to the lower surface 41 of the sieve plate 35. The collection casing 184 includes a collection casing chamber 187 that is in fluid communication with the plurality of the sieve plate inlet apertures 44, which all (or each) reside within a first surface area 97 (shown in FIG. 3). The distributor head 157 resides within (or a portion of the distributor head 157 extends into) the collection casing chamber 187, such that: (i) the distributor head aperture(s) 166 and/or the dome hole(s) 169 are in fluid communication with the collection casing chamber 187.

The chemical feeder 1, in some aspects of the present disclosure, comprises at least one outlet 86 in the housing 11 through which a treated liquid (as depicted by an arrow 89) that includes dissolved chemical material is removed from the housing 11, such as from the housing chamber 20. Each outlet 86 can be independently positioned in any appropriate portion or portions of the housing 11, such as, but not limited to, in the housing sidewall 17 and/or the housing base 14. In some aspects, and as depicted in the drawings, the outlet 86 is positioned in (or through) the housing sidewall 17.

The outlet 86 is positioned below the sieve plate 35, in some aspects. For purposes of non-limiting illustration and with reference to FIG. 1, the outlet 86 is positioned below the sieve plate 35, and, more particularly, below the lower surface 41 of the sieve plate 35. With some aspects, the chemical feeder 1 includes a standpipe (not shown) residing within the housing chamber 20 which is in fluid communication with the outlet 86. The upper end of the standpipe is, in some aspects, positioned above the outlet 86 and below the lower surface 41 of the sieve plate 35.

In some aspects, with reference to FIG. 1, the outlet 86 is in fluid communication with an outlet pipe 196 that resides within the housing chamber 20. The outlet pipe 196 includes an opening 199 that is in fluid communication with the housing chamber 20. In some aspects, the opening 199 of the outlet pipe 196 is in facing opposition relative to the interior surface 23 of the housing base 14.

With further reference to FIG. 1, and for purposes of non-limiting illustration, the sieve plate 35 includes a plurality of sieve plate support legs 115. Each sieve plate support leg 115 extends from the interior surface 23 of the housing base 14 to the lower surface 41 of the sieve plate 35. The sieve plate 35 is maintained in position above the interior surface 23 of the housing base 14 at least in part by the sieve plate support legs 115, in some aspects. The sieve plate 35 can include any suitable number of sieve plate support legs 115, such as at least 2, at least 3, at least 4, or at least 5 sieve plate support legs 115. For ease of illustration, only two sieve plate support legs 115 are depicted in FIG. 1. In some aspects, the sieve plate 35 includes three sieve plate support legs 115. In some aspects, the sieve plate 35 may be supported on a ring (not shown) that extends radially inward from the interior surface 26 of the housing sidewall 17. In such aspects, the sieve plate 35 is supported on an upper surface of the ring.

Figure 3:
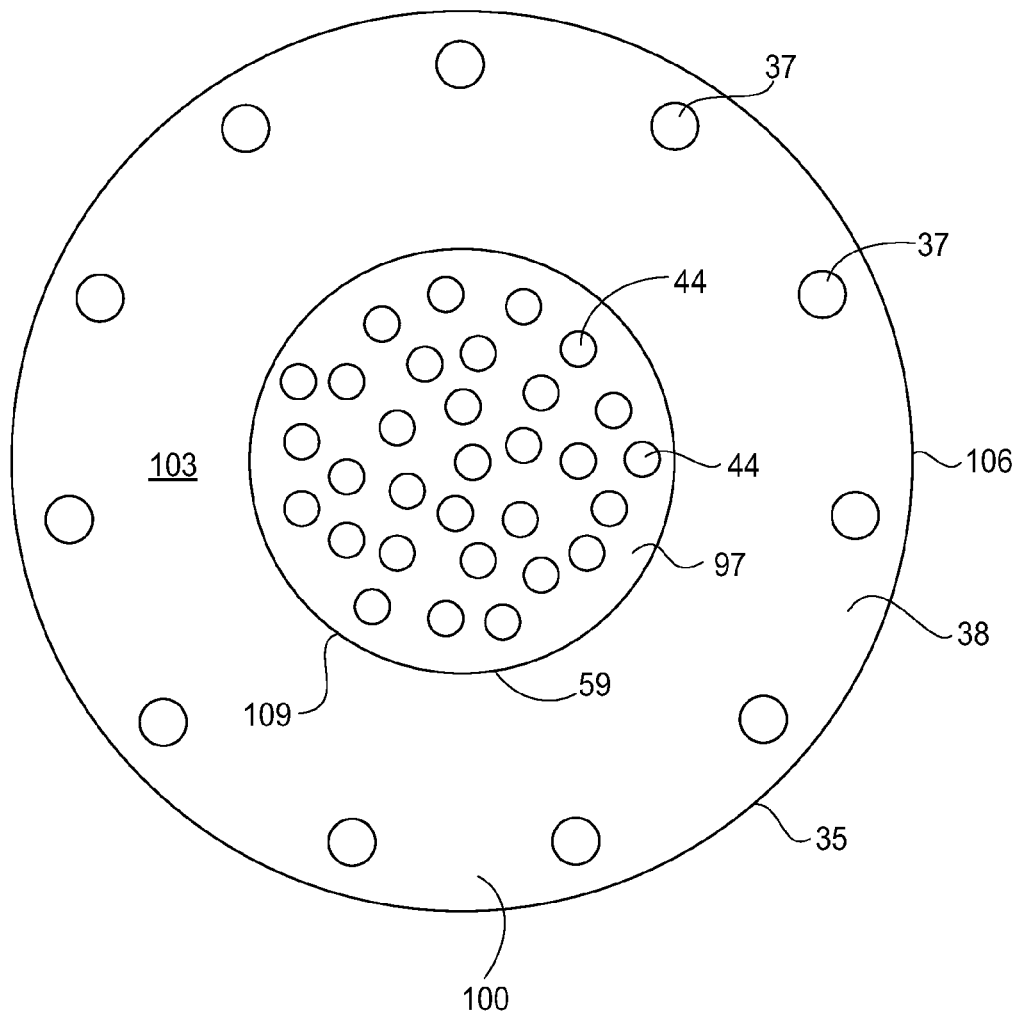
FIG. 3 is a representative top plan view of a sieve plate according to some aspects of the present disclosure, in which a plurality of sieve plate inlet apertures all reside within a first surface area of the sieve plate and a plurality of sieve plate outlet apertures all reside within a second surface area of the sieve plate.

In some aspects of the present disclosure, and with reference to FIG. 3, the upper surface 38 of the sieve plate 35 defines a first surface area and a second surface area that together define the total surface area of the upper surface 38 of the sieve plate 35. The first surface area (such as the first surface area 97), the total surface area (such as a total surface area 100), and the related second/annular surface area (such as a second surface area 103) of the upper surface 38 of the sieve plate 35 are each described herein with reference to FIG. 3. The plurality of sieve plate inlet apertures 44 all reside within the first surface area 97, while the plurality of sieve plate outlet apertures 37 all reside within the second surface area 103. The plurality of sieve plate outlet apertures 37 are spaced radially outward relative to the plurality of sieve plate inlet apertures 44, in some aspects.

The sieve plate 35, in some aspects, has outer sieve plate edge 106 (shown in FIG. 1). The outer sieve plate edge 106 is spaced from an interior surface 26 of the housing sidewall 17. The outer sieve plate edge 106 and the interior surface 26 of the housing sidewall 17 together define a sieve plate annular space 112, in some aspects. The sieve plate annular space 112 is in fluid communication with the outlet 86 (of the housing). At least a portion of the treated liquid passes through the sieve plate annular space 112. With reference to FIG. 1, and for purposes of non-limiting illustration, the outer sieve plate edge 106 and the interior surface 26 of the housing sidewall 17 together define the sieve plate annular space 112. The sieve plate annular space 112 is in fluid communication with the outlet 86 of the housing 11. Treated liquid passes across the upper surface 38 of the sieve plate 35 (such as across the second surface area 103 of the upper surface 38 of the sieve plate 35, FIG. 3), drops/passes down through the sieve plate annular space 112, and passes out of the housing 11 through the outlet 86, as indicated by the arrow 89, in some aspects.

In some aspects, and with further reference to FIG. 3, the second surface area 103 resides outside of (or beyond) the first surface area 97 and extends to an outer sieve plate edge 106. The second surface area 103 of the upper surface 38 of the sieve plate 35 is, with some aspects, an annular surface area that is defined by an outer perimeter 109 of the lower cartridge opening 59 and the outer sieve plate edge 106. The second surface area 103 of the upper surface 38 of the sieve plate 35 is, with some aspects, free of sieve plate inlet apertures 44 and only contains sieve plate outlet apertures 37. Similarly, the first surface area 97 of the upper surface 38 of the sieve plate 35 is, in some aspects, free of sieve plate outlet apertures 37 and only contains sieve plate inlet apertures 44.

The flow of feed liquid into the housing 11 can be adjusted (such as turned on and off, increased, or decreased) manually and/or automatically, using mechanical and/or electronic systems, in some aspects. The flow of feed liquid into the housing 11 is, in some aspects, controlled relative to the liquid level within the housing 11, such as within the housing chamber 20. In some aspects, when the liquid level in the housing chamber 20, below the sieve plate 35: (i) drops below a predetermined level, feed liquid is introduced into the housing chamber 20; and (ii) rises above a predetermined level, the introduction of feed liquid into the housing chamber 20 is stopped. In some aspects, and with non-limiting reference to FIG. 1, the inlet 80 or the inlet pipe 172 includes an inlet valve (not shown) that is controllably coupled to a float (not shown) that resides within the housing chamber 20 below the sieve plate 35. The float rises and falls with the level of liquid (not shown) in the housing chamber 20 below the sieve plate 35. When the float rises (with the liquid level) above a predetermined level, the inlet valve is closed, and the flow of feed liquid into the housing chamber 20 (such as into the collection casing 184) is stopped, in some aspects. When the float falls or drops (with the liquid level) below the predetermined level, the inlet valve is opened and feed liquid flows into the housing chamber 20 (such as into the collection casing 184).

Figure 2:
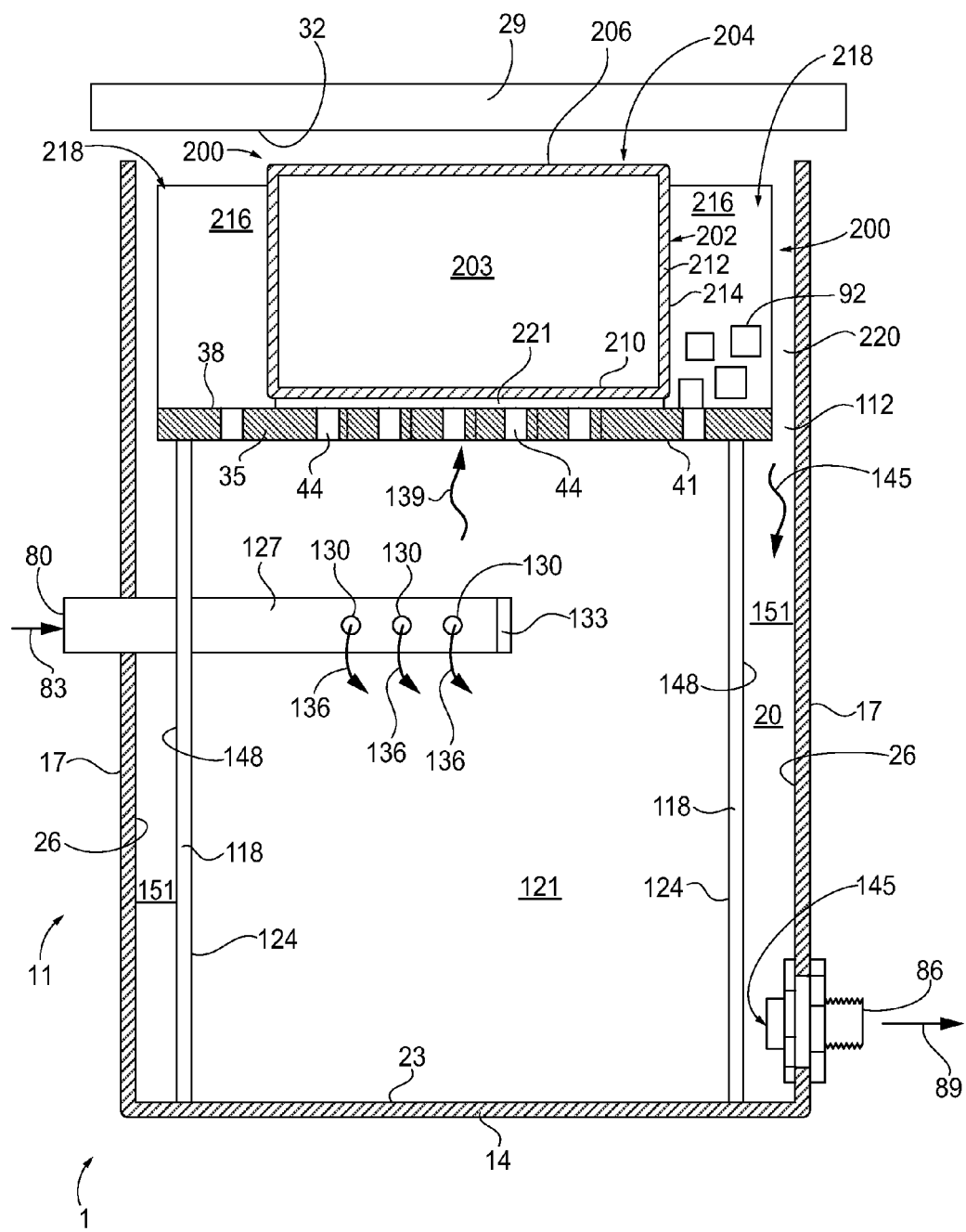
FIG. 2 is a representative, partially exploded, side, elevational, partial sectional view of a chemical feeder in accordance with some aspects of the present disclosure, which includes an inner sidewall.

With non-limiting reference to FIG. 2, and for purposes of illustration, a chemical feeder 1 comprises an inner sidewall 118 that resides within the housing chamber 20. The inner sidewall 118 extends from the interior surface 23 of the housing base 14 to the lower surface 41 of the sieve plate 35. The inner sidewall 118 supports the sieve plate 35 and defines an inner chamber 121 that resides below the sieve plate 35. In some aspects, an inner surface 124 of the inner sidewall 118, the interior surface 23 of the housing base 14, and the lower surface 41 of the sieve plate 35 together define the inner chamber 121.

With further reference to FIG. 2, in some aspects, the inlet 80 of the housing 11 is in fluid communication with the inner chamber 121, and the inner chamber 121 is in fluid communication with at least some of the plurality of the sieve plate inlet apertures 44. With further reference to FIG. 2, and in accordance with some aspects, the inlet 80 is in fluid communication with an inlet pipe 127 that extends through the inner sidewall 118 and into the inner chamber 121. The inlet pipe 127 includes a plurality of inlet pipe apertures 130. The inlet pipe 127, in some aspects, includes a terminal plug 133. With reference to FIG. 2, an exterior surface 148 of the inner sidewall 118 and the interior surface 26 of the housing sidewall 17 together define an annular chamber 151.

In some aspects, and with further reference to FIG. 2, feed liquid (as indicated by arrow 83) is introduced into the housing 11 through the inlet 80, passes through the inlet pipe 127, out through the inlet pipe apertures 130, and into the inner chamber 121, as indicated by the arcuate arrows 136. The feed liquid then passes from the inner chamber 121 and up through at least some of the sieve plate inlet apertures 44 (as indicated by the serpentine arrow 139) The feed liquid contacts solid chemical material 92 and forms a treated liquid (that includes dissolved chemical material). The treated liquid then passes through the sieve plate annular space 112, down through the annular chamber 151 (as indicated by the serpentine arrows 145), and out of the housing 11 through the outlet 86, as indicated by the arrow 89.

Figure 6:
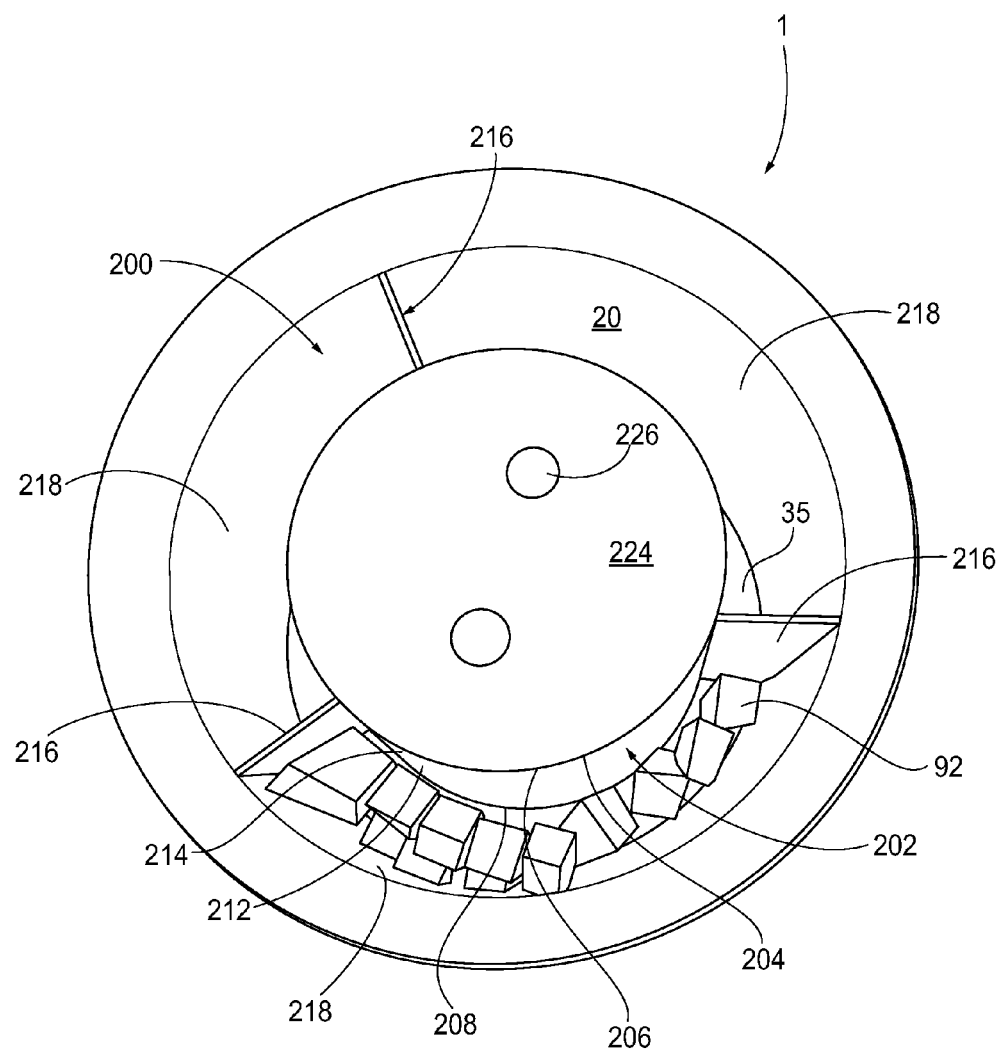
FIG. 6 is a representative top perspective view of a chemical feeder according to some aspects of the present disclosure, which includes therein a cartridge configured for use with the chemical feeder.

With reference to FIGS. 1, 2, and 6, the chemical feeder 1 in some aspect of the present disclosure further comprises a cartridge 200 positioned within the housing chamber 20 and above the upper surface 38 of the sieve plate 35. The cartridge 200 comprises a tubular member 202 having an upper end 204, which defines an upper opening 206; a lower end 208, which defines a lower opening 210; and a sidewall 212 having a sidewall outer surface 214 that extends from the upper end 204 to the lower end 208. As used herein the term "sidewall" with regard to the cartridge means "at least one sidewall" that, with some aspects, defines a sidewall structure, and correspondingly includes singular and plural referents thereof. With some aspects, the sidewall 212 is a unitary sidewall (or unitary sidewall structure). With some further aspects, the sidewall 212 is composed of two or more sidewalls (not depicted in the drawings).

The cartridge 200 of the chemical feeder 1, in some aspects, is a cylindrical cartridge, such as depicted in the drawings. In some aspects, a diameter of the upper opening 206 is substantially equal to a diameter of the lower opening 210 to define a substantially tubular interior having a substantially uniform diameter along a longitudinal length of the tubular member 202. In some aspects, the cartridge 200 has a sectional shape orthogonal to its longitudinal axis selected from circular shapes, elliptical shapes, polygonal shapes (e.g., triangular, rectangular, pentagonal, hexagonal, heptagonal, octagonal, etc.), irregular shapes, and combinations of two or more such shapes.

Figure 8:
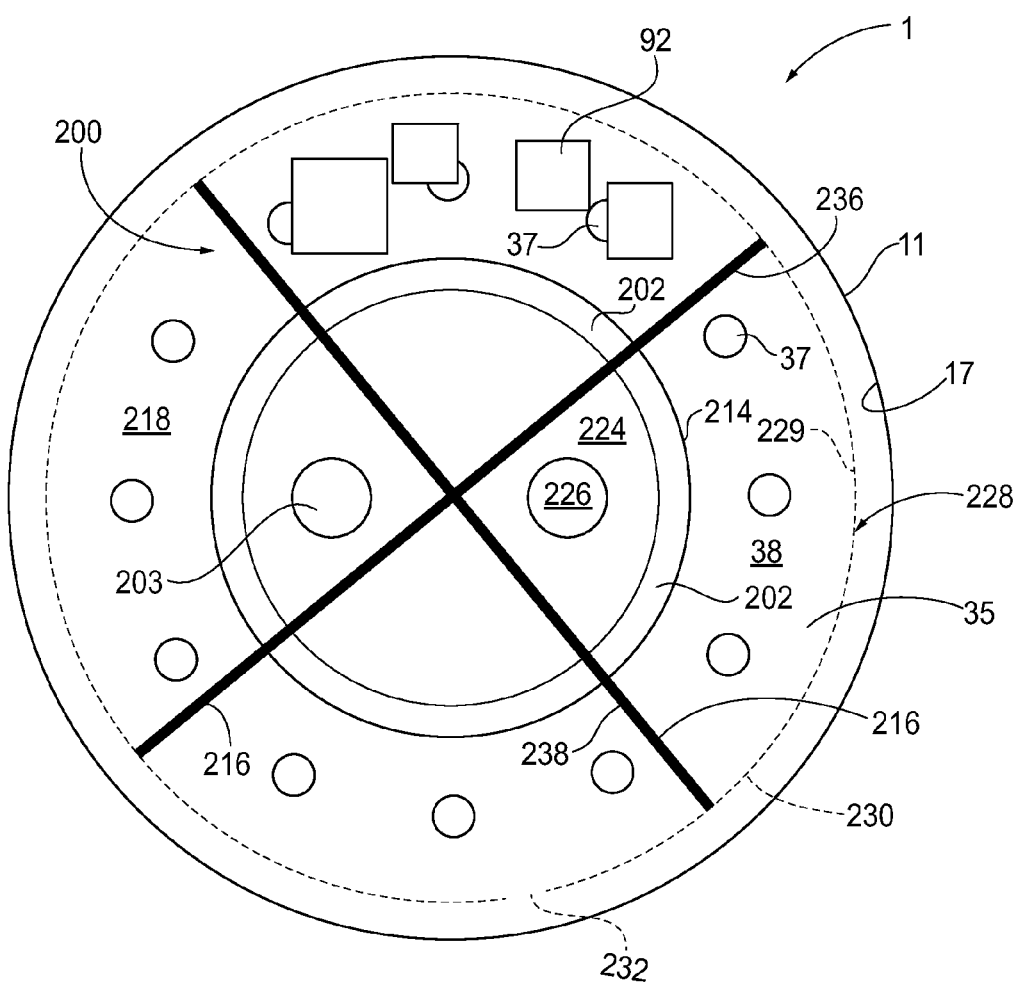
FIG. 8 is a representative top partial sectional plan view of the cartridge in use with a chemical feeder in accordance with some aspects of the present disclosure.

The cartridge 200 comprises a plurality of partitions 216 extending from the sidewall outer surface 214 of the tubular member 202. As used herein, the term "partitions" refers to elements extending radially outward from and/or relative to the sidewall outer surface 214. The partitions 216 can be permanently or removably affixed to the sidewall outer surface 214. One or more partitions 216 may be added or removed to increase or decrease the number of total partitions 216 in connection with the sidewall outer surface 214 of the tubular member 202. With reference to FIG. 8, the partitions 216 are, with some aspects, spaced radially apart in equal angular intervals. In other aspects, the partitions 216 are spaced apart in unequal angular intervals.

With continuing reference to FIG. 8, the partitions 216 define a plurality of pockets 218. Each of the plurality of pockets 218, at least in part, is defined by and resides between adjacent partitions 216 and the sidewall outer surface 214 of the tubular member 202. With some aspects, each of the plurality of pockets 218 is further defined by the interior surface 26 of the housing sidewall 17 of the housing 11. At least one of the plurality of pockets 218 is adapted to receive a solid chemical material 92 therein, as described herein. With reference to FIG. 6, the solid chemical material 92 is, with some aspects, in tablet form such that a plurality of tablets can be disposed within each pocket 218. Each of the plurality of pockets 218 is dimensioned such that at least one tablet of the solid chemical material 92 is disposed within the pocket 218, with some aspects. In some aspects, a plurality of tablets of solid chemical material 92 are disposed within at least one pocket 218. The solid chemical material 92 can be placed in one or more pockets 218.

Referring further to FIGS. 1 and 2, the partitions 216 can be spaced apart from the interior surface 26 of the sidewall 17 of the housing 11. In this manner, a space 220 is defined between a terminal edge of each of the plurality of partitions 216 and the interior surface 26 of the sidewall 17. Desirably, and in some aspects, the space 220 is smaller than the smallest dimension of solid chemical material 92 such that the solid chemical material 92 is retained within the pocket 218 defined between adjacent partitions 216. In other aspects, the partitions 216 are in direct physical contact with the interior surface 26 of the sidewall 17. In such aspects, the partitions 216 can be formed integrally with the interior surface 26 of the sidewall 17.

With continued reference to FIGS. 1 and 2, the cartridge 200 is positioned within the housing chamber 20. A lower end 208 is positioned on or above the upper surface 38 of the sieve plate 35. The plurality of partitions 216 each include a lower edge 222 that is supported on the upper surface 38 of the sieve plate 35. The lower edge 222 of the partitions 216 extends in a downward direction relative to the lower end 208 of the tubular member 202 such that the lower end 208 of the tubular member 202 is elevated from the upper surface 38 of the sieve plate 35 to define a gap 221 to allow feed liquid to pass from the sieve plate inlet apertures 44 to the plurality of pockets 218. The lower edge 222 of each partition 216 defines at least one support leg 234 (shown in FIG. 7). As used herein, recitations with regard to the lower edge of partitions 216 being positioned on the upper surface 38 of the sieve plate 35, mean that: (i) at least a portion of the lower edge 222 of at least one of the partitions 216 and the upper surface 38 of the sieve plate 35 abut each other; and/or (ii) one or more other structures are interposed between the lower edge 222 of at least one of the partitions 216 and the upper surface 38 of the sieve plate 35 (provided the lower cartridge opening 210 is not totally obstructed). Examples of other structures that can be interposed between the lower edge 222 of at least one of the partitions 216 and the upper surface 38 of the sieve plate 35 include, but are not limited to, gaskets, spacers, and extensions (such as peg extensions) extending up from the upper surface 38 of the sieve plate 35 (not shown in the drawings). As depicted in the drawings, and in accordance with some aspects, the lower edge 222 of the partitions 218 and the upper surface 38 of the sieve plate 35 abut each other.

Figure 7:
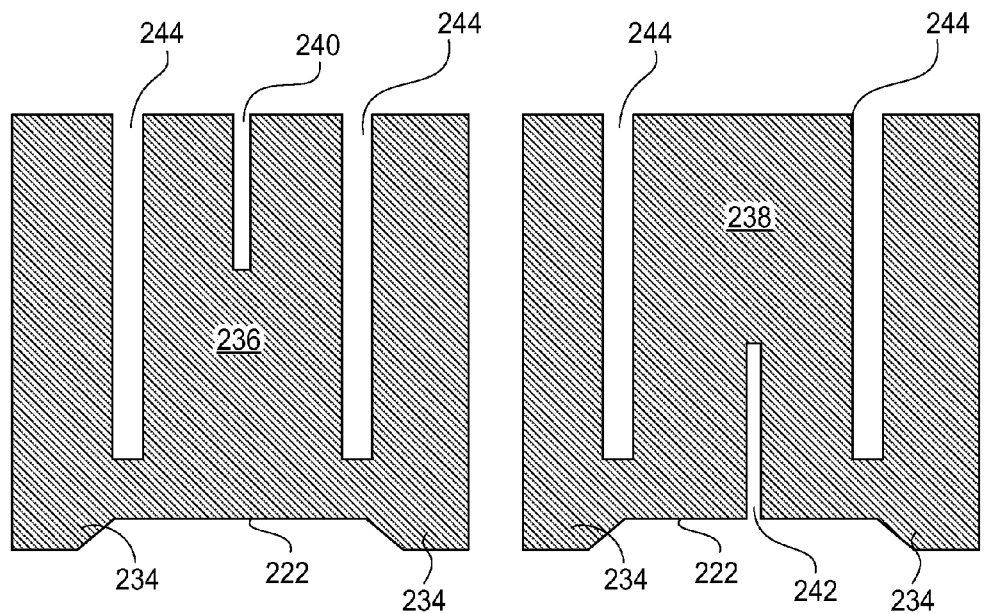
FIG. 7 is representative side plan view of a pair of interlocking plates that define the partitions of the cartridge in accordance with some aspects of the present disclosure.

With reference to FIG. 7, in some aspects, the partitions 216 are formed by at least a pair of interlocking first and second plates 236, 238. The first and second plates 236, 238 are substantially planar and are configured to interlock in a substantially perpendicular orientation relative to each other, such as shown in FIG. 8. In other aspects, the pair of first and second plates 236, 238 may interlock at an obtuse or acute angle. The partitions 216 may be formed by any number of interlocking plates, such as at least 2, at least 3, at least 4, or at least 5 interlocking plates. For ease of illustration, only first and second plates 236, 238 are depicted in FIG. 7. The first plate 236 has a first recess 240 extending from an upper portion of the first plate 236 toward the lower portion of the first plate 236 along an approximate lateral midpoint of the first plate 236. Similarly, the second plate 238 has a second recess 242 extending from a lower portion of the second plate 238 toward an upper portion of the second plate 238 along an approximate midpoint of the second plate 238. The first recess 240 and the second recess 242 are configured to receive each other, such that the first and second plates 236, 238 are interlocked, such as reversibly interlocked.

With continuing reference to FIG. 7, each of the first and second plates 236, 238 has a pair of slots 244 extending from the upper portion toward the lower portion of the first and second plates 236, 238. The slots 244 are configured to receive the sidewall 212 of the tubular member 202 when the first and second plates 236, 238 are interlocked as depicted in FIG. 8. The first and second plates 236, 238 include a lower edge 222 that is configured to be supported on the upper surface 38 of the sieve plate 35. The lower edge 222 of the first and second plates 236, 238 extends in a downward direction relative to the lower end 208 of the tubular member 202 such that the lower end 208 of the tubular member 202 is elevated from the upper surface 38 of the sieve plate 35 to allow feed liquid to pass from the sieve plate inlet apertures 44 to the plurality of pockets 218. The lower edge 222 of each of the first and second plates 236, 238 defines at least one support leg 234.

During operation of the chemical feeder 1, in some aspects, at least some of the feed liquid introduced into the housing 11, such as into the housing chamber 20, passes up through at least some of the plurality of sieve plate inlet apertures 44 that are in fluid communication with at least one of the plurality of pockets 218, where the feed liquid contacts a solid chemical material 92 residing within at least one of the plurality of pockets 218. The solid chemical material 92 as depicted in FIGS. 1 and 2, is in the form of tablets. In some aspects, a plurality of tablets are present in at least one of the plurality of pockets 218, from the lower end 208 and substantially up to the upper end 204 of the tubular member 202. The solid chemical material 92 can, with some aspects, be in the form of granules, pellets, and/or tablets. In some aspects, the size, shape, and/or form, of the solid chemical material 92 is selected such that it will not fall down through or otherwise clog one or more sieve plate outlet apertures 37. Various solid chemical materials 92 that can be used with the chemical feeders of the present disclosure are discussed in further detail herein. The chemical feeder, in some aspects of the present disclosure, is free of the solid chemical material residing outside of at least one of the plurality of pockets 218.

Contact of the feed liquid with the solid chemical material 92 results in the formation of a treated liquid that includes dissolved chemical material, with some aspects. At least a portion of the treated liquid passes through at least some of the sieve plate outlet apertures 37, and is removed from the housing 11 through the outlet 86, as indicated by the arrow 89. Delivery rate of the treated liquid can be varied by controlling the flow rate of the feed liquid and the number of pockets 218 having the solid chemical material 92 therein.

With reference to FIG. 8, the upper end 204 of the tubular member 202 of the cartridge 200 has a cover 224 (also shown in FIG. 6) configured for enclosing the upper opening 206 of the tubular member 202. The cover 224 prevents solid chemical material 92 from entering into an interior space 203 of the tubular member 202 through the upper opening 206. The cover 224 can be permanently or removably affixed to the upper end 204 of the tubular member 202. In some aspects, the cover 224 is attached to the upper end 204 of the tubular member 202 by art-recognized reversibly closeable systems, such as matching threaded sections and/or fasteners (not shown). In some aspects, the cover 224 is attached to the upper end 204 of the tubular member 202 by a substantially permanent system, such as by adhesives and/or welds. In some aspects, the cover 224 and the upper end 204 of the tubular member 202 together form (or are) a unitary structure. The cover 224 has one or more cover apertures 226 extending through an upper surface of the cover 224. One or more cover apertures 226 are configured to facilitate removal of the cartridge 200 from the housing 11. Desirably, in some aspects, one or more cover apertures 226 are formed smaller than the smallest dimension of solid chemical material 92 to prevent solid chemical material 92 from entering into the interior space of the tubular member 202 through one or more cover apertures 226.

With continued reference to FIG. 8, the chemical feeder 1 optionally comprises a sleeve 228 (shown in dashed line) provided between the tubular member 202 and housing sidewall 17. The sleeve 228 has a bottom portion 230 positioned on the upper surface 38 of the sieve plate 35. In some aspects, the sleeve 228 is formed as a tubular element that is positioned between the tubular member 202 and the housing sidewall 17. Each of the plurality of pockets 218 is further defined by the sidewall outer surface 214 of the tubular member 202 and an inner surface 229 of the sleeve 228.

The sleeve 228 includes at least one sleeve aperture 232 configured for facilitating removal of the sleeve 228 from the housing 11. The sleeve 228 can be permanently or removably affixed to the upper surface 38 of the sieve plate 35. In some aspects, the sleeve 228 is attached to the upper surface 38 of the sieve plate 35 by art-recognized reversibly closeable systems, such as matching threaded sections and/or fasteners (not shown). In some aspects, the sleeve 228 is attached to the upper surface 38 of the sieve plate 35 by a substantially permanent system, such as by adhesives and/ welds. With some aspects, the sleeve 228 and the upper surface 38 of the sieve plate 35 together form (or are) a unitary structure.

Referencing FIG. 1, the chemical feeder 1, in some aspects, comprises a lid 29 that is reversibly attached to an upper end 30 of the housing sidewall 17, and at least a portion of the upper cartridge end abuts an inner surface 32 of the lid 29. For purposes of non-limiting illustration and with reference to FIG. 1, the chemical feeder 1 includes a lid 29 that is (depicted in a partially exploded view) reversibly attached to the upper portion 30 of the housing sidewall 17. In some aspects, the upper end 204 of the cartridge 200 abuts the inner surface 32 of the lid 29. Abutment between the upper end 204 of the cartridge 200 and the inner surface 32 of the lid 29 can, in some aspects, be a sealing abutment (such as through which liquid does not pass) or a non-sealing abutment (such as through which liquid can pass). In some aspects, the upper end 204 of the cartridge 200 and the inner surface 32 of the lid 29 are spaced from each other and are substantially free of abutment there-between (not depicted in the drawings). The space between the upper end 204 of the cartridge 200 and the inner surface 32 of the lid 29 is selected, in some aspects, so as to be less than the smallest dimension of the solid chemical material 92 residing within any of the plurality of the pockets 218, which minimizes or eliminates solid chemical material 92 residing outside of the pockets 218.

The lower end 208 of the cartridge 200, in some aspects of the chemical feeder 1 of the present disclosure, defines a first surface area that corresponds to at least a portion of the first surface area 97 on the upper surface 38 of the sieve plate 35. The plurality of sieve plate inlet apertures 44 all reside within the first surface area 97 and define a fluid path for feed liquid from at least one of the plurality of sieve plate inlet apertures 44 to at least one of the plurality of pockets 218. In some aspects, feed liquid is introduced through the inlet 80 of the housing 11 and passes through the nozzle 154, through and out of the distributor head 157 (via the distributor head aperture(s) 166 and/or dome hole(s) 169 (if so equipped)), and up through at least some of the sieve plate inlet apertures 44 (see FIG. 1). In other aspects, feed liquid is introduced into the housing 11 through the inlet 80, passes through the inlet pipe 127, out through the inlet pipe apertures 130, and into the inner chamber 121 and up through at least some of the sieve plate inlet apertures 44 (see FIG. 2). Once the feed liquid passes through at least some of the sieve plate inlet apertures 44, the feed liquid flows across the first surface area 97 on the upper surface 38 of the sieve plate 35 and onto the second surface area 103 on the upper surface 38 of the sieve plate 35 (shown in FIG. 3). The feed liquid flows through the gap 221 defined between the lower opening 210 of the tubular member 202 and the upper surface 38 of the sieve plate 35 and into at least one of the pockets 218. Alternatively, or in addition, in some aspects feed liquid flows through one or more openings 232 extending through the sidewall 212 of the tubular member 202 and into at least one of the pockets 218.

The pockets 218 define a second surface area that corresponds to at least a portion of the second surface area 103 on the upper surface 38 of the sieve plate 35 to define a fluid path from at least one pocket 218 to at least one sieve plate outlet aperture 37. The feed liquid contacts the solid chemical material 92 in one or more pockets 218 and forms a treated liquid (that includes dissolved chemical material 92) which passes through at least one of the sieve plate outlet apertures 44 and into the housing chamber 20 before being discharged through the outlet 86, as indicated by arrow 89 in FIG. 1.

Referring back to FIG. 2, the chemical feeder 1, in some aspects of the present disclosure, further includes the inner sidewall 118 that resides within the housing chamber 20. The inner sidewall 118 extends from an inner surface of the housing base 14 to the lower surface 41 of the sieve plate 35. The inner sidewall 118 supports the sieve plate 35 and defines the inner chamber 121 that resides below the sieve plate 35. The inlet 80 of the housing 11 is in fluid communication with the inner chamber 121, and the inner chamber 121 is in fluid communication with at least some of the plurality of sieve plate inlet apertures 44 that are in fluid communication with the pockets 218. During operation, in some aspects, feed liquid (as indicated by the arrow 83) is introduced into the housing 11 through the inlet 80, passes through the inlet pipe 127, out through the inlet pipe apertures 130, and into the inner chamber 121, as indicated by arcuate arrows 136. The feed liquid then passes from the inner chamber 121 and up through at least some of the sieve plate inlet apertures 44 (as indicated by the serpentine arrow 139). The feed liquid flows through the gap 221 defined between the lower opening 210 of the tubular member 202 and the upper surface 38 of the sieve plate 35 and into at least one of the pockets 218. Alternatively, or in addition, in some aspects feed liquid flows through one or more openings 232 extending through the sidewall 212 of the tubular member 202 and into at least one of the pockets 218. The feed liquid contacts the solid chemical material 92 in one or more pockets 218 and forms a treated liquid (that includes dissolved chemical material 92). The treated liquid then passes through the sieve plate annular space 112, down through annular chamber 151 (as indicated by the serpentine arrows 145), and out of the housing 11 through the outlet 86, as indicated by the arrow 89 in FIG. 2.

The chemical feeders of the present disclosure and the various components thereof, such as, but not limited to, the housing 11, sieve plate 35, sieve plate support legs 115, inner sidewall 118, cartridge 200 (including tubular member 202 and plurality of partitions 216), nozzle 154, distributor head 157, and collection casing 184, can each be independently fabricated from any suitable material or combination of materials that are chemically and/or corrosion resistant to the solid chemical material and fluids (or liquids) used. Examples of suitable fabrication materials include, but are not limited to, polyethylene, ABS (acrylonitrile-butadiene-styrene resin), fiberglass reinforced resins, polystyrene, polypropylene, poly(vinyl chloride), chlorinated poly(vinyl chloride), or any other appropriate material(s) that is chemically resistant to the solid chemical being dispensed, such as a sanitizing agent, such as calcium hypochlorite. Other materials, such as stainless steel, can additionally or alternatively be used, but the use of such material would result in a significant increase in cost of the chemical feeder 1. With some aspects, one or more components of the chemical feeder 1, such as the housing 11, are fabricated from poly(vinyl chloride) (PVC), rotation molded polyethylene, or other appropriate material, which is generally chemically resistant to water sanitizing chemicals, such as calcium hypochlorite. In accordance with some aspects of the present disclosure: at least a portion of the housing sidewall (such as the housing sidewall 17); the lid (such as the lid 29); and/or the cartridge (such as the cartridge 200), are each fabricated from transparent PVC, which allows for visual inspection of the amount of solid chemical material 92 present in one or more pockets (such as the pockets 218) without opening the housing 11. Plastic parts of the chemical feeder 1 can be fabricated by art-recognized methods including, but not limited to, injection molding and rotational molding.

When constructed of plastic resin material, the various parts of the chemical feeder 1 can, in some aspects, be joined by solvent or heat welding or by threading. If a metal, such as stainless steel is used, conventional metal welding of the parts can be used to fabricate the chemical feeder 1. Alternatively, the various parts of the chemical feeder 1 can be joined by conventional threaded bolts and appropriate gasketing to ensure that the chemical feeder 1 is sealed, such as being liquid-tight, such as water-tight. The inlet 80 and outlet 86 of the housing 11 can, in some aspects, be joined to feed and removal conduits (not shown) by, for example, matched threaded sections, quick release fittings, plastic welding, and/or adhesives (not shown).

The various gaskets or seals, such as annular gaskets associated with the lid, used in the chemical feeder 1 are, in some aspects, fabricated from resilient materials that are resistant to the solid chemical materials and liquids used. Examples of materials from which the gaskets can be fabricated include, but are not limited to, rubber, such as natural rubber, styrene-butadiene rubber, neoprene rubber, EPDM (ethylene propylene diene monomer (M-class) rubber) and silicone rubber; and fluorinated materials, such as homopolymers and copolymers of tetrafluoroethylene and chlorotrifluoroethylene, and copolymers of vinylidene fluoride and hexafluoropropylene.

The solid chemical material 92, or treating agent, used with the chemical feeders 1 of the present disclosure can be any chemical that is solid at ambient (or standard) conditions of temperature and pressure (STP), and which is readily soluble in the liquid, such as water, that is introduced into the chemical feeder 1, at STP conditions. In some aspects, the solid chemical material 92 is capable of being formed into pellets or tablets. The solid chemical material 92, in some aspects, is in the form of tablets that have a diameter which is greater than the diameter of the sieve plate apertures, such as the sieve plate inlet apertures 44. Examples of such solid chemical materials 92, include, but are not limited to: sanitizing agents such as chemicals that sanitize water, such as calcium hypochlorite, bromo-chloro hydantoins (such as, 1-bromo-3-chloro-5,5-dimethylhydantoin), dichlorohydantoins and chloroisocyanurates; dechlorination agents such as sodium sulfite, sodium metabisulfite, sodium bisulfite, sodium thiosulfate, sodium hydrosulfide (NaSH), and sodium sulfide ($Na_2S$); and pH control agents such as sodium bisulfate, citric acid, sodium carbonate, sodium bicarbonate, and quaternary ammonium compounds, some of which can be used also as algaecides or antibacterial agents.

The chemical feeder 1 of the present disclosure can, with some aspects, be integrated into fluid, such as water, treatment operations by appropriate piping connected with the inlet 80 and outlet 86. The chemical feeder 1 can be integrated into, for example: a single pass system, such as an aqueous stream used to sanitize the surface of an article, such as vegetables, such as potatoes, or surfaces used in the handling or processing of food; or a closed loop system, such as a swimming pool or hot tub. With some aspects, the chemical feeder 1 via the inlet 80 and outlet 86, is connected directly (such as in-line) with the main fluid conduit used to recycle and treat a fluid, such as water, from a stationary body of fluid, such as a swimming pool. Further examples of single pass systems into which the chemical feeder 1 of the present disclosure can, with some aspects, be integrated, include, but are not limited to single pass systems from which drinking water is produced and wastewater treatment systems.

The present disclosure also relates to a method of treating a body of liquid comprising: (a) providing the chemical feeder 1 of the present disclosure as described previously herein; (b) drawing a feed liquid from a body of liquid; (c) introducing the feed liquid into the inlet 80 of the chemical feeder 1; (d) removing a treated liquid from the outlet 86 of the chemical feeder 1; and (e) introducing at least a portion of the treated liquid into the body of liquid. In accordance with some aspects, steps (b) through (e) are performed continuously.

With some aspects of the method of the present disclosure, the inlet 80 of the chemical feeder 1 is connected directly in-line with a main water conduit used to handle water withdrawn from a body of water. In this configuration, the outlet 86 of the pump used to recycle the water is in direct fluid communication (by way of a suitable conduit) with the inlet 80 of the chemical feeder 1, in which case the chemical feeder 1 is located on the pressure side of the recycle pump. The pressure of the liquid stream (such as an aqueous stream) introduced into the inlet 80 of the chemical feeder 1 can vary widely, and is, with some aspects, from 5 pounds per square inch (psi) (34 kilopascals) to 30 psi (206 kilopascals), or from 5 psi (35 kilopascals) to 10 psi (69 kilopascals). The flow rate of the liquid stream (such as an aqueous stream) through the chemical feeder 1 can also vary widely, and is, with some aspects, from 0.5 to 100 gallons per minute (1.9 to 379 liters per minute), from 5 to 75 gallons per minute (19 to 284 liters per minute), from 10 to 50 gallons per minute (38 to 189 liters per minute), or from 1 to 5 (3.8 to 19 liters per minute).

The present invention has been described with reference to specific details of particular aspects thereof. It is not intended that such details be regarded as limitations upon the scope of the disclosure except insofar as and to the extent that they are included in the accompanying claims.

What is claimed is:

1. A chemical feeder comprising:
    (a) a housing comprising a housing base and a housing sidewall that together define a housing chamber having an inner surface;
    (b) a sieve plate comprising an upper surface, a lower surface, and at least one sieve plate inlet aperture extending from said lower surface to said upper surface of said sieve plate, wherein said sieve plate is positioned within said housing chamber and above an inner surface of said housing base;
    (c) at least one inlet in said housing through which a feed liquid is introduced into said housing chamber;
    (d) at least one outlet in said housing through which a treated liquid comprising dissolved chemical material is removed from said housing chamber; and
    (e) a cartridge positioned within said housing chamber and above said upper surface of said sieve plate, said cartridge comprising:
        (1) a tubular member comprising a bottom end, a top end, and a sidewall extending between said bottom end and said top end to define a sidewall outer surface; and
        (2) a plurality of partitions extending from said sidewall outer surface of said tubular member to define a plurality of pockets, wherein at least a portion of a lower edge of at least one of the partitions and said upper surface of said sieve plate abut each other, wherein each of said plurality of pockets is defined between adjacent partitions, said sidewall outer surface of said tubular member and said upper surface of said sieve plate, and wherein at least one of said plurality of pockets is adapted to receive a solid chemical material therein, wherein at least some of said feed liquid introduced into said housing chamber through said inlet passes through said at least one sieve plate inlet aperture into at least one of said plurality of pockets where said feed liquid contacts said solid chemical material residing within at least one of said plurality of pockets so as to form a treated liquid, and at least a portion of said treated liquid is removed from said housing through said outlet.

2. The chemical feeder of claim 1, wherein said bottom end of said tubular member is offset from said upper surface of said sieve plate to define a fluid path between said at least one sieve plate inlet aperture and at least one of said plurality of pockets.

3. The chemical feeder of claim 1, wherein each of said plurality of pockets is further defined by said sidewall outer surface of said tubular member and said inner surface of said housing chamber.

4. The chemical feeder of claim 1, wherein said sieve plate further comprises at least one sieve plate outlet aperture extending from said lower surface to said upper surface of said sieve plate, wherein said at least one sieve plate outlet aperture is in fluid communication with said outlet, and wherein said at least one sieve plate outlet aperture is positioned under at least one of said plurality of pockets.

5. The chemical feeder of claim 4, wherein said at least one sieve plate outlet aperture is offset radially outward relative to said at least one sieve plate inlet aperture.

6. The chemical feeder of claim 4, wherein said at least one sieve plate outlet aperture is a plurality of sieve plate outlet apertures positioned under said plurality of pockets.

7. The chemical feeder of claim 1, wherein said sieve plate comprises a plurality of sieve plate support legs, each sieve plate support leg extending from an inner surface of said housing base to said lower surface of said sieve plate.

8. The chemical feeder of claim 1, wherein said housing sidewall comprises a support surface adapted for supporting said sieve plate on said support surface.

9. The chemical feeder of claim 1, further comprising an inner sidewall residing within said housing chamber, said inner sidewall extending from an inner surface of said housing base to said lower surface of said sieve plate, said inner sidewall supporting said sieve plate and defining an inner chamber residing below said sieve plate, wherein said inlet is in fluid communication with said inner chamber, and said inner chamber is in fluid communication with said at least one sieve plate inlet aperture.

10. The chemical feeder of claim 1, further comprising a cover adapted to enclose said top end of said tubular member.

11. The chemical feeder of claim 10, wherein said cover comprises at least one cover aperture extending through said cover and configured for facilitating removal of said cartridge from said housing chamber.

12. The chemical feeder of claim 1, further comprising a lid reversibly attached to an upper end of said housing sidewall.

13. The chemical feeder of claim 1, wherein said inlet and said outlet are positioned below said sieve plate.

14. The chemical feeder of claim 1, further comprising a sleeve provided between said tubular member and said housing sidewall, wherein a bottom portion of said sleeve is positioned on said upper surface of said sieve plate.

15. The chemical feeder of claim 14, wherein said sleeve comprises at least one sleeve aperture configured for facilitating removal of said sleeve from said housing.

16. The chemical feeder of claim 14, wherein each of said plurality of pockets is further defined by said sidewall outer surface of said tubular member and an inner surface of said sleeve.

17. The chemical feeder according to claim 1, wherein at least one extension extends upwardly from the upper surface of the sieve plate to abut at least a portion of a lower edge of at least one of the partitions.

18. A method of treating a body of liquid comprising:
(a) providing the chemical feeder of claim 1;
(b) drawing said feed liquid from a body of liquid;
(c) introducing said feed liquid into said inlet;
(d) removing said treated liquid from said outlet; and
(e) introducing at least a portion of said treated liquid into said body of liquid.

19. A chemical feeder comprising:
(a) a housing comprising a housing base and a housing sidewall that together define a housing chamber having an inner surface;
(b) a sieve plate comprising an upper surface, a lower surface, and at least one sieve plate inlet aperture extending from said lower surface to said upper surface of said sieve plate, wherein said sieve plate is positioned within said housing chamber and above an inner surface of said housing base;
(c) at least one inlet in said housing through which a feed liquid is introduced into said housing chamber;
(d) at least one outlet in said housing through which a treated liquid comprising dissolved chemical material is removed from said housing chamber; and
(e) a cartridge positioned within said housing chamber and above said upper surface of said sieve plate, said cartridge comprising:
(1) a tubular member comprising a bottom end, a top end, and a sidewall extending between said bottom end and said top end to define a sidewall outer surface; and
(2) a plurality of partitions extending from said sidewall outer surface of said tubular member to define a plurality of pockets, wherein each of said plurality of pockets is defined between adjacent partitions and said sidewall outer surface of said tubular member, and wherein at least one of said plurality of pockets is adapted to receive a solid chemical material therein, wherein at least a portion of said plurality of partitions has support legs positioned on said upper surface of said sieve plate to offset said bottom end of said tubular member from said upper surface of said sieve plate, wherein at least some of said feed liquid introduced into said housing chamber through said inlet passes through said at least one sieve plate inlet aperture into at least one of said plurality of pockets where said feed liquid contacts said solid chemical material residing within at least one of said plurality of pockets so as to form a treated liquid, and at least a portion of said treated liquid is removed from said housing through said outlet.

20. A chemical feeder comprising:
(a) a housing comprising a housing base and a housing sidewall that together define a housing chamber having an inner surface;

(b) a sieve plate comprising an upper surface, a lower surface, and at least one sieve plate inlet aperture extending from said lower surface to said upper surface of said sieve plate, wherein said sieve plate is positioned within said housing chamber and above an inner surface of said housing base;

(c) at least one inlet in said housing through which a feed liquid is introduced into said housing chamber;

(d) at least one outlet in said housing through which a treated liquid comprising dissolved chemical material is removed from said housing chamber; and (e) a cartridge positioned within said housing chamber and above said upper surface of said sieve plate, said cartridge comprising:

(1) a tubular member comprising a bottom end, a top end, and a sidewall extending between said bottom end and said top end to define a sidewall outer surface; and (2) a plurality of partitions extending from said sidewall outer surface of said tubular member to define a plurality of pockets, wherein each of said plurality of pockets is defined between adjacent partitions and said sidewall outer surface of said tubular member, and wherein at least one of said plurality of pockets is adapted to receive a solid chemical material therein, wherein a first portion of said plurality of partitions is defined by a first plate, wherein a second portion of said plurality of partitions is defined by a second plate, wherein said first plate and said second plate are interlocked with each other, and wherein said first plate and said second plate further comprise at least one slot configured to receive at least a portion of said sidewall of said tubular member, wherein at least some of said feed liquid introduced into said housing chamber through said inlet passes through said at least one sieve plate inlet aperture into at least one of said plurality of pockets where said feed liquid contacts said solid chemical material residing within at least one of said plurality of pockets so as to form a treated liquid, and at least a portion of said treated liquid is removed from said housing through said outle.

21. A cartridge for a chemical feeder, said cartridge comprising:

a tubular member comprising a bottom end, a top end, and a sidewall extending between said bottom end and said top end to define a sidewall outer surface;

a plurality of partitions extending radially outward from said sidewall outer surface to define a plurality of pockets, wherein each of said plurality of pockets is defined between adjacent partitions and said sidewall outer surface of said tubular member, and wherein at least one of said plurality of pockets is adapted to receive a solid chemical material; and wherein at least one partition of the plurality of partitions comprises at least one support leg, permitting feed liquid to pass through to the pockets.

22. A cartridge for a chemical feeder, said cartridge comprising:

a tubular member comprising a bottom end, a top end, and a sidewall extending between said bottom end and said top end to define a sidewall outer surface;

a plurality of partitions extending radially outward from said sidewall outer surface to define a plurality of pockets, wherein each of said plurality of pockets is defined between adjacent partitions and said sidewall outer surface of said tubular member, and wherein at least one of said plurality of pockets is adapted to receive a solid chemical material; and wherein the plurality of partitions are formed by at least one pair of interlocking plates.

23. A cartridge for a chemical feeder, said cartridge comprising:

a tubular member comprising a bottom end, a top end, and a sidewall extending between said bottom end and said top end to define a sidewall outer surface;

a plurality of partitions extending radially outward from said sidewall outer surface to define a plurality of pockets, wherein each of said plurality of pockets is defined between adjacent partitions and said sidewall outer surface of said tubular member, and wherein at least one of said plurality of pockets is adapted to receive a solid chemical material; and wherein the plurality of partitions comprise one or more slots configured to receive the sidewall of the tubular member.

* * * * *

UNITED STATES PATENT AND TRADEMARK OFFICE
CERTIFICATE OF CORRECTION

PATENT NO. : 10,160,677 B2
APPLICATION NO. : 14/800200
DATED : December 25, 2018
INVENTOR(S) : Richard H. Ferguson et al.

It is certified that error appears in the above-identified patent and that said Letters Patent is hereby corrected as shown below:

In the Claims

Column 19, Line 41, Claim 20, delete "outle." and insert -- outlet. --

Signed and Sealed this
Nineteenth Day of March, 2019

Andrei Iancu
*Director of the United States Patent and Trademark Office*